July 18, 1967

J. J. WERTH 3,331,707

THERMO-PHOTOVOLTAIC CONVERTER WITH RADIENT ENERGY REFLECTIVE MEANS

Filed July 31, 1963

INVENTOR.

John J. Werth

BY

Paul J. Etherington

ATTORNEY

United States Patent Office 3,331,707
Patented July 18, 1967

3,331,707

THERMO-PHOTOVOLTAIC CONVERTER WITH RADIANT ENERGY REFLECTIVE MEANS

John J. Werth, Santa Barbara, Calif., assignor to General Motors Corporation, Detroit, Mich., a corporation of Delaware Filed July 31, 1963, Ser. No. 298,919
6 Claims. (Cl. 136—89)

This invention relates to the conversion of heat into electricity and, more particularly, to means for improving the efficiency of apparatus performing such a conversion.

Since the introduction of the photovoltaic or solar cell, a new concept in converting heat into electricity has been proposed. In accordance with this concept, an emitting surface is heated to incandescence, and the photons which are produced thereby are concentrated on one or more photovoltaic devices to produce electricity. Devices which perform this conversion are known as thermo-photovoltaic converters.

In general terms the TPV converter involves a heat source such as a combustion chamber into which fuel may be introduced for burning and from which exhaust gases may be withdrawn or, alternatively, the heat source may consist of radioisotopes embedded below an emitting surface. The heat source thus includes a surface for emitting photons. Arranged around the emitting surface and spaced therefrom is an array of photovoltaic cells which are usually arranged in such a configuration as to be uniformly irradiated with photons. The efficiency of the TPV converter has been limited by the difficulty of controlling the wavelengths of energy emitted from the surface such that only energy which is useable in the photovoltaic cells is generated. The cells, being semiconductor devices which produce electricity through electron-hole pair generation, are able to efficiently use only photon energy within a predetermined range. For example, energy emitted at a wavelength longer than about 1.9 microns cannot be converted into electricity in photovoltaic germanium. An inordinate percentage of longer wavelength energy can, of course, be avoided by maintaining a high temperature in the combustion chamber. The higher the temperature of the incandescent surface, the higher the energy of the emitted photons and the higher the percentage of photons falling within the useful spectral range. However, the extremely high temperatures required to substantially eliminate lower energy photons, impose very stringent requirements upon the materials used in the heat source. While the softening point of the materials may be above the operating temperature, rapid oxidation shortens converter life markedly.

An additional factor which limits conversion efficiency is the presence of very high energy photons. These photons are emitted at a very short wavelength and, thus, possess more than enough energy to produce electron-hole pair generation in the photovoltaic material of the cell. When exposed to such a high energy photon, electron-hole pair generation will occur in the cell, but the excess energy in the photon is dissipated in the form of heat.

In general, the present invention contemplates an increase in the efficiency of a TPV converter by returning energy which is outside of the useable energy range of the photovoltaic cell to the source of photons. In general, this invention may be accomplished through the use of spectral filtering means on selected surfaces of the cells which effectively sort out radiant energy which is outside of the energy range required to produce efficient electron-hole pair generation from the radiant energy which is within this useable range. In the specific embodiment described herein the surface of the photovoltaic cell which is farthest from the heat source is placed adjacent a reflecting element which efficiently reflects long wave energy. When so placed, this element reflects energy which has passed through the cell back to the source, thus, preventing the escape of low energy photons which do not contribute to electron-hole pair generation. Adjacent the cell surface which is closest to the photon source and shielding said surface from the source is an interference filter element which effectively rejects short wave energy and returns this energy to the source. This element prevents short wave high energy photons from being admitted to the photovoltaic material of the cell where electron-hole generation would occur but with a corresponding dissipation of excess energy in the form of heat.

The present invention, as will subsequently be described in detail, further embraces additional improvements which increase the efficiency of the conversion process. In particular, a specific embodiment to be described conserves the number of cells which is required for the conversion process. In particular, this embodiment calls for a cylindrical arrangement of cells around a substantially elongated and cylindrical combustion chamber and emission surface, together with particularly designed reflective surfaces at opposite ends of the cylinder to insure a uniform irradiation of the cells.

The invention further provides optional means for improving the efficiency of conversion by further reducing loss due to escape or absorption of long wave irradiation. In general, this is accomplished by modifying the boundary between the cell material and the adjacent electrode to provide for a decreased reflection loss.

The details of the invention will be more completely understood upon reference to the following specification which is to be taken with the accompanying drawings of which:

Figure 1:
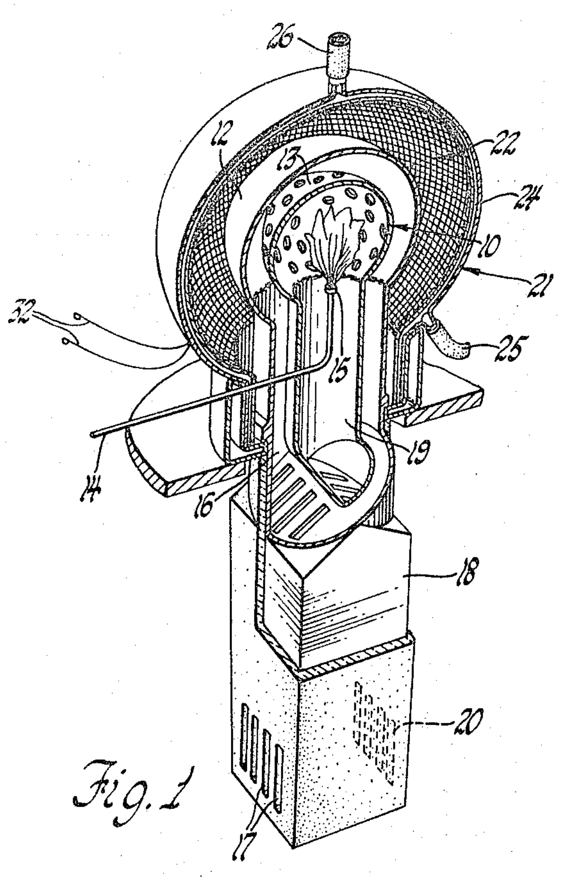
FIGURE 1 is a partly sectioned view of an illustrative TPV converter employing the present invention.
Figures 3, 4:
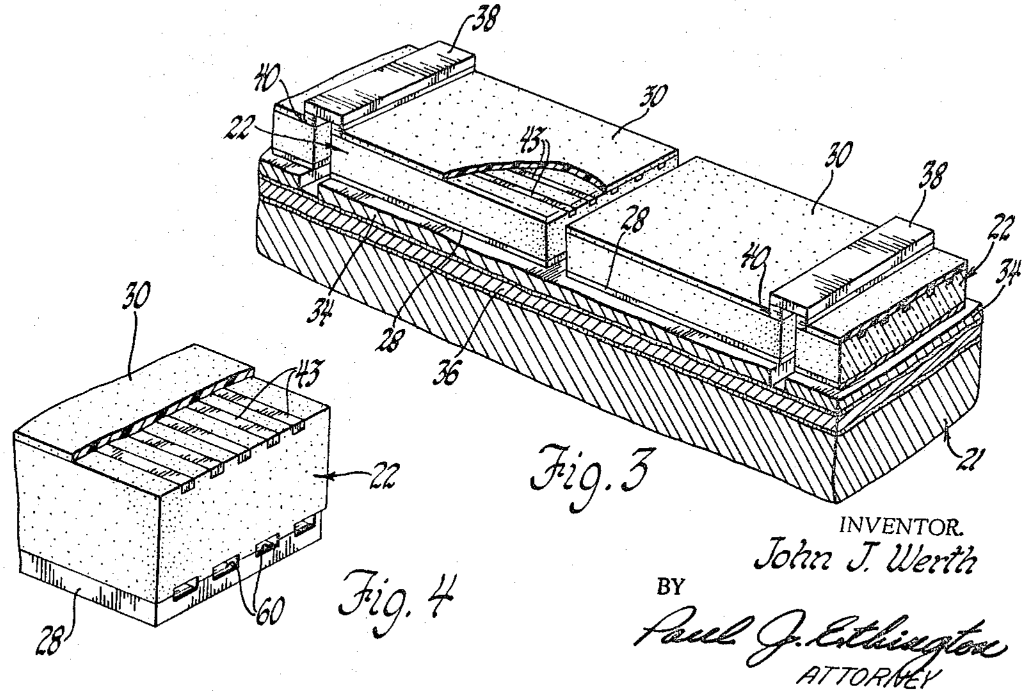
FIGURE 3 is a detailed view of a portion of the converter of FIGURE 1 illustrating a particular cell construction.
FIGURE 4 is a detailed view of an alternative cell construction.

Referring now to FIGURE 1, the thermo-photovoltaic converter, which is here illustrated, comprises a spherical combustion chamber 10 having an emissive surface 12 and a perforated inner flame guard 13. The chamber 10 is provided with a fuel intake line 14 which terminates at a cermet nozzle 15. An exhaust passage 16 terminates at exit 17. The exhaust may be passed through a heat exchanger at 18 before being exited. The combustion chamber 10 may be made of a metallic substrate with an oxidation resistant inside coating and an emissivity enhancing coating on the outer surface 12. Other possible substrate materials are non-metallic such as silicon carbide, chromia, plated alumina, etc. An air passage 19 for aiding combustion of the gas from intake line 14 is communicable with an inlet point 20. Arranged in a spherical pattern around the combustion chamber 10 and spaced therefrom as indicated, is an array of photovoltaic cells 22 which are semiconductor devices adapted to produce an electrical output when irradiated by light energy of a wavelength which corresponds with or exceeds characteristic energy gap of the semiconductor materials. Suitable cell materials are commercially available and will not be described in detail. In the present instance, it is contemplated that the cells 22 are germanium. The cells 22 are suitably affixed to the inner surface of the body 21 of the TPV converter as subsequently described. The converter body may be provided with a water jacket 24 which is provided with an inlet 25 and an outlet 26. As seen in FIGURE 3, a reflecting electrode 28 is cemented to the back surface of each of the cells 22. The electrodes 28 serve to reflect long wave radiation which has passed through the cells 22 back to the surface 12 of the combustion chamber 10. The electrodes 28 also serve the purpose of connecting the cells 22 in the desired electrical configuration. Also consonant with the present invention, filtering elements 30 are disposed on the front surface of cells 22; that is, the surface closest to the combustion chamber 10. The filter elements 30 serve to reflect short wave radiation back to the surface 12 of the combustion chamber 10. However, filter elements 30 do not reflect radiation of a wavelength which is within the aforementiond useable range.

The operation of the TPV converter is apparent from FIGURE 1. Fuel is introduced into the combustion chamber 10 through the intake line 14, where it is mixed with air entering through passage 19 for combustion in chamber 10. The surface 12 soon is heated to incandescence and emtis light energy over a fairly broad frequency spectrum. A portion of this energy occupies or falls into the useable range of the photovoltaic cells 22. However, a substantial portion of the emitted radiation is of a longer wavelength or lower energy than is effective to produce electron-hole pair generation in the cells 22. This is due to the fact that a relatively low temperature is maintained in the combustion on chamber 10. Nevertheless, a portion of the emitted radiation is of a wavelength which is significantly shorter than that required to produce electron-hole pair generation in the cells 22. The excess, if allowed to penetrate the cells 22, would be dissipated as heat. Radiated energy which is within the useable range produces electrical energy within the cells 22. The electrical energy may be coupled out of the cells over a pair of D.C. output terminals 32 and applied to a load which is not here to be considered. Energy emitted from surface 12 which is outside of the useable range, either because the wavelength is too long or too short, is reflected back to the surface 12 by the reflecting elements 28 and 30 respectively.

Figure 2:
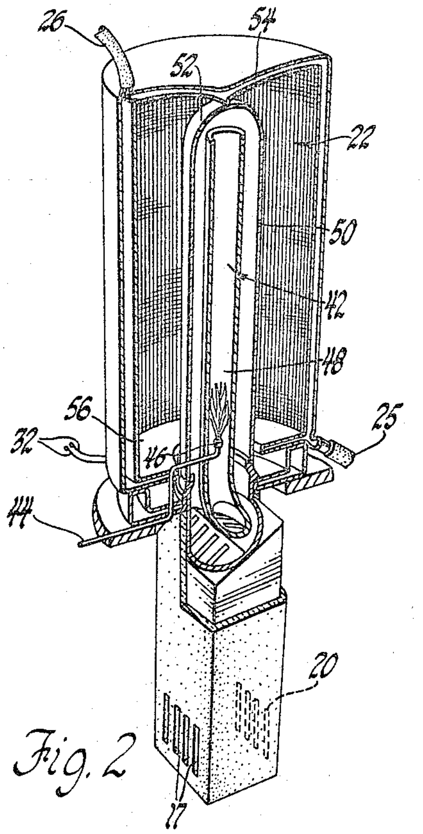
FIGURE 2 is a partly sectioned view of a TPV converter showing an alternative cell arrangement.

Referring now to FIGURE 2, there is represented an alternative arrangement of a TPV converter which is designed to conserve on the required number of cells for the conversion process. In this figure, the cells 22 are arranged in a substantially cylindrical array an elongated cylindrical combustion chamber 42. The combustion chamber 42 is provided with a fuel input line 44 which terminates at the lower portion of the chamber 42 in a cermet nozzle 46. In a manner similar to the converter shown in FIGURE 1, the combustion chamber 42 includes an inner guard member 48 and an outer member 50 having an emissive surface 52 which is substantially of cylindrical form. The products of combustion are exited via a path running between the inner and outer members 48 and 50 and communicated with an exhaust port 17. Air is introduced into the chamber via path 20 as indicated. For cooling purposes, the converter body is provided with a water jacket having an inlet 25 and an outlet 26, essentially equivalent to that of the embodiment as shown in FIGURE 1. The construction of FIGURE 2 obviously differs from that of FIGURE 1 in that the arrangement of FIGURE 2 is substantially cylindrical. In order to insure uniform irradiation of the cells 22, the upper and lower end walls are provided with reflective interior surfaces 54 and 56 respectively which are highly efficient radiant energy reflectors. Surface 56 may be essentially flat as shown. However, to obtain the proper reflection characteristics of the energy from the combustion chamber surface 52, surface 54 is somewhat dish-shaped with the cross section of the surface taking the form of two exponential curves which converge at the center. The arrangement of FIGURE 2, of course, operates on the same principles as the arrangement of FIGURE 1 to provide a D.C. output on lines 32.

One form of spectral filtering means is shown in the enlarged view of FIGURE 3. In FIGURE 3 it is clearly shown that each of the cells 22 is mounted on the body 21 of the converter by means of the highly reflective electrode 28, a layer of conductive cement 34, and a layer of insulating cement 36. The electrode 28 is made of a material which is chosen such that the reflectivity of the boundary between the electrode 28 and the germanium cell 22 is highly reflective to energy which is passed through the germanium cell 22 without being absorbed. It is known that germanium is quite transparent to photons which are not of sufficient energy to produce electron-hole generation; therefore, in accordance with the invention, the electrode 28 prevents the escape of this long wave energy. Suitable materials for the electrode 24 are gold and copper.

Disposed on the surface of the cell 22 is which is closest to the emitting surface 12 of the combustion chamber 10 is the filter element 30. In accordance with the invention, the effect of the element 30 is to reject photons which have an excess of energy above that required to produce electron-hole pair generation in the germanium cell 18. To avoid the dissipation of this excess energy as heat, it is desirable to reflect these short wavelength photons back to the surface 12. Accordingly, element 30 must reflect short wavelengths while allowing the passage of longer wavelengths which are within the useable range of the germanium cell 22. A suitable material from which to construct the filter 30 is silicon monoxide in a single layer 1.2 microns thick. At the same time, filter element 30 increases the amount of useful radiation absorbed by the front surface of the cell, because it acts as an anti-reflection filter at the optimum wavelengths.

Describing the electrical connections in the arrangement of FIGURE 3, the cells 22 are connected serially in pairs of opposite conductivity type; that is, one of the cells 22 may be P/N while the other cells may be N/P. The serial connection through the cells is completed by means of the conductive cement 34, the gold electrode 28 and a plurality of jumper collecting electrodes 38 which are disposed on conductive supports 40 which are in contact with the cells 22. Each of the cells 22 is provided with a plurality of gold collector grid elements 43 disposed in the upper highly doped portions thereof. The grid elements 43 serve to collect electrons which are freed by photon bombardment and to conduct the freed electrons toward the collector jumper 38. Thus, the grid elements 43 are low impedance paths for the movement of electrons. As will be apparent to those skilled in the art, other electrical connections are possible. For example, an alternate scheme is to use cells of all of the same conductivity type and merely connect the cells in stair-step fashion by alternately overlaying the cells. In this arrangement the conductive grid elements 43 would again be disposed in the upper portions of the cells and a jumper electrode means interconnecting the overlaying cells. Additional photocell connections will be apparent to those skilled in the art, and it is to be understood that the present invention is not limited to any particular interconnection as long as such interconnection is compatible with the present invention.

As will be apparent to those skilled in the art, intrinsic semiconductors which have not been doped with *p* or *n* type impurities are more transparent to longer wavelengths than doped semiconductors. Thus, to insure maximum efficiency in the return of longer wavelengths to the heat source, it may be desirable to construct the bodies of the cells 22 primarily of intrinsic semiconductor material. In such a configuration a very shallow layer adjacent the gold electrode 28 in each of the cells 22 may be doped with *p* type impurities and very shallow areas beneath the electrode grid elements 43 may be doped with *n* type impurities, leaving the greater portion of the cells as undoped intrinsic material. Long wavelength energy which is outside of the useable wavelength range of the cells, thus, travels for the most part through intrinsic semiconductor material and less energy loss due to heating is experienced. The use of intrinsic material offers the additional advantages of insuring a considerably longer lifetime of holes and electrons than a doped material, and also presenting less resistance to charge movement. Various cell configurations compatible with the present invention will be apparent to those skilled in the art.

Looking now to the arrangement of FIGURE 4, a brief explanation of the purpose of this arrangement is in order. It has been found that at certain wavelengths, for example, 4.8 microns, the reflection loss at a germanium-gold boundary is higher than that which might occur at a boundary of gold and some other substance such as, for example, silicon monoxide or air. Therefore, to further improve the efficiency of the filtering arrangement of the present invention, shallow spaces or pockets 60 may be formed in the boundary between the cells 22 and the gold electrode 28. This may be accomplished by suitably grooving the cell 22, or the electrode 28 or, as shown, both. The pockets 60 run the length of the cells 22 and electrode 28 and may be filled with a suitable substance which, in combination with the cell 22, presents a lower reflection loss of long wavelength energy than the germanium-gold boundary. Suitable substances have been found to be air or silicon monoxide. One factor to be considered in using air is that sufficient thermal conductivity between the cells 22 and the water jacket 24 as shown in FIGURE 1 must be maintained through the gold electrode 28 and the cement layers 34 and 36, both of which are thermally conductive, to prevent overheating of the cells. Inasmuch as air is thermally insulative, it is in many instances more advantageous to fill the pocket 60 with silicon monoxide which presents a better thermal path than does air.

It is to be understood that the invention is not limited to the particular embodiments shown in the above described figures, but is subject to modification and alteration as will be apparent to those skilled in the art. For a definition of the invention reference should be had to the appended claims.

What is claimed is:

1. In a thermo-photovoltaic converter wherein a source emits radiant energy over a broad wavelength range, a photovoltaic cell to produce electrical energy when irradiated by energy of a predetermined wavelength within the range, the cell having front and rear surfaces and being spaced from the source to receive radiant energy being emitted therefrom, means adjacent the rear surface of the cell to reflect back to the source radiant energy of a wavelength longer than the predetermined wavelength, means adjacent the front surface of the cell to reflect back to the source radiant energy of a wavelength shorter than the predetermined wavelength, said front surface being disposed toward the source such that the shorter wavelength energy does not penetrate the cell and the longer wavelength energy does penetrate the cell before being reflected.

2. In a thermo-photovoltaic converter including a source which emits radiant energy over a broad frequency spectrum, an array of photovoltaic cells to produce electrical energy when irradiated by energy of a predetermined frequency band within said specturm, the cells having front and rear surfaces and being positioned about and spaced from the source with the front surface facing the source to be uniformly irradiated by energy emitted therefrom, means adjacent the rear surface of each of the cells to reflect back to the source radiant energy of a frequency lower than the predetermined frequency band, and means adjacent the front surface of each of the cells to reflect back to the source radiant energy of a frequency higher than the predetermined frequency band.

3. In a thermo-photovoltaic converter including an incandescent source which emits radiant energy over a broad wavelength spectrum, a photovoltaic cell to produce electrical energy in response to incident radiation of a predetermined range of wavelengths within said spectrum, the cell having front and rear surfaces and being spaced from the source with the front surface disposed toward the source to receive radiant energy being emitted therefrom, an electrode in electrical contact with the rear surface of the cell and composed of a material which is reflective to radiant energy of a wavelength longer than the predetermined wavelength range, and filter means adjacent the front surface of the cell and reflective to radiant energy of a wavelength shorter than the predetermined range.

4. In a thermo-photovoltaic converter, a substantially cylindrical combustion chamber which emits radiant energy over a broad frequency spectrum, a substantially cylindrical array of photovoltaic cells positioned about and spaced from the soure to be uniformly irradiated by energy emitted therefrom, each of the cells having a front surface disposed toward the source and a rear surface disposed away from the source, the interior surfaces of the end walls of the converter being reflective to energy within the spectrum thereby to uniformly irradiate the array, said photovoltaic cells producing electrical energy when irradiated by radiant energy of a predetermined range of wavelengths within said spectrum, means adjacent the rear surface of each of the cells to reflect back to the source radiant energy of a wavelength longer than the predetermined wavelength range, and means adjacent the front surface of each of the cells to reflect back to the source radiant energy of a wavelength shorter than the predetermined wavelength range.

5. In a thermo-photovoltaic converter including a source of radiant energy which emits over a broad spectrum of wavelengths, a photovoltaic cell to produce an electrical output when irradiated by energy of a predetermined range of wavelengths within the range, the cell having a front surface facing the source and a rear surface disposed away from the source, electrode means adjacent the rear surface of the cell and adapted for electrical connection to an output line, the electrode means having spaces formed in the surface adjacent the cell, said spaces containing a selected substance which, in combination with the material of the electrode, is reflective to radiant energy of a wavelength longer than the predetermined wavelength range.

6. In a thermo-photovoltaic converter including a source of radiant energy which emits over a broad spectrum of wavelengths, a photovoltaic cell to produce an electrical output when irradiated by energy of a predetermined range of wavelengths within the spectrum, the cell having a front surface facing the source and a rear surface disposed away from the source, electrode means adjacent the rear surface of the cell and adapted for electrical connection to an output line, the cell having spaces formed in the surface adjacent the electrode, the spaces containing a selected substance which, in combination with the material of the electrode, is reflective to radiant energy of a wavelength longer than the predetermined wavelength.

(References on following page)

References Cited

UNITED STATES PATENTS

| | | | |
|---|---|---|---|
| 2,938,938 | 5/1960 | Dickson | 136—89 |
| 3,031,519 | 4/1962 | Silverman | 136—89 |

OTHER REFERENCES

Dale et al.: Proc. 14th Ann. Power Sources Conf., New Jersey. Pp. 22–25. October 1960.

Mann: Proc. 14th Ann. Power Sources Conf., New Jersey. Pp. 28–32. October 1960.

Wedlock: Proc. IEEE. Pp. 694–8. May 1963.

White et al.: Proc. 15th Ann. Power Sources Conf., New Jersey. Pp. 125–32. October 1961.

WINSTON A. DOUGLAS, *Primary Examiner.*

A. M. BEKELMAN, *Assistant Examiner.*